J. SEIFFERT.
ADJUSTABLE MEASURING COVER FOR JARS, CANS, &c.
APPLICATION FILED MAY 15, 1908.
937,723.
Patented Oct. 19, 1909.
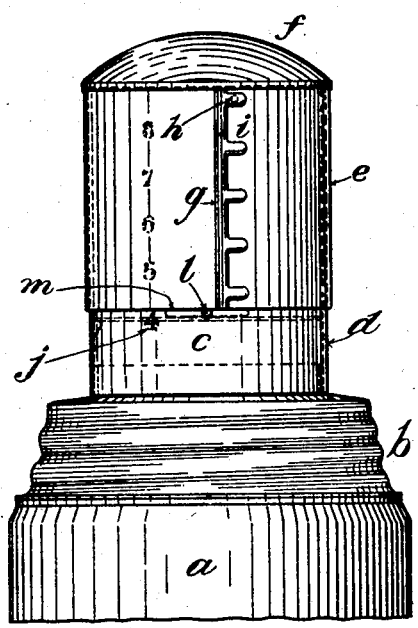
Fig.1.
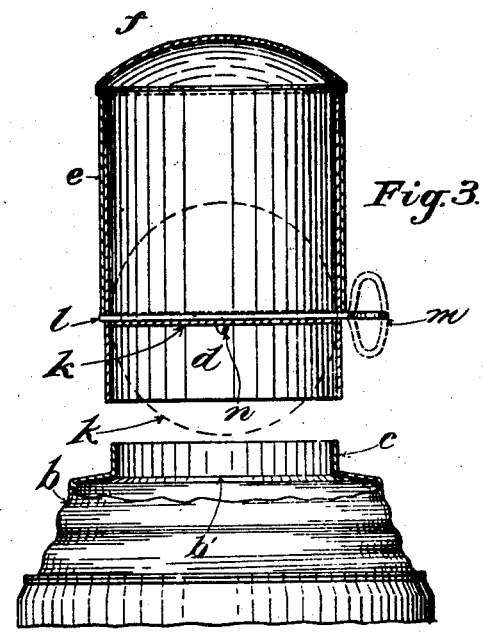
Fig.3.
Fig.4.
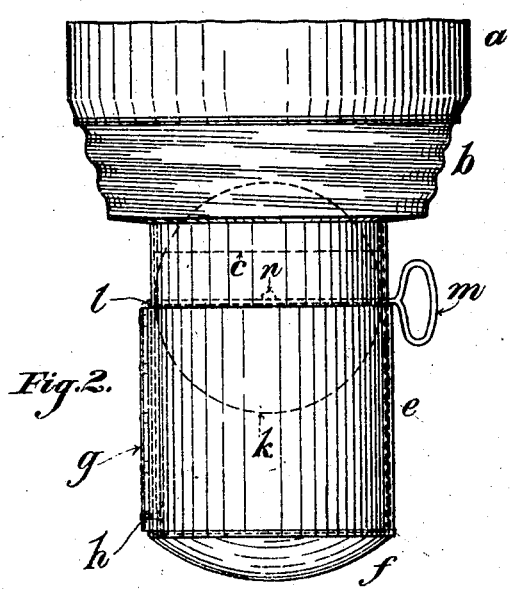
Fig.2.
Witnesses:
A. D. Gerking.
Cecil Long
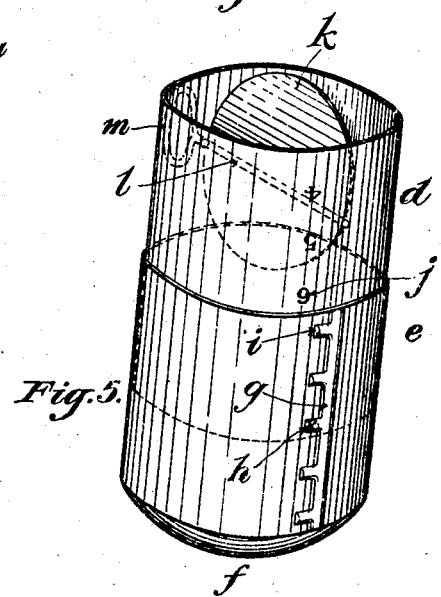
Fig.5.
Inventor:
Joseph Seiffert
by F. J. Geisler Att'y.

UNITED STATES PATENT OFFICE.

JOSEPH SEIFFERT, OF PORTLAND, OREGON.

ADJUSTABLE MEASURING-COVER FOR JARS, CANS, &c.

937,723.  Specification of Letters Patent.  Patented Oct. 19, 1909.

Application filed May 15, 1908. Serial No. 433,134.

*To all whom it may concern:*

Be it known that I, JOSEPH SEIFFERT, a citizen of the United States, and a resident of Portland, in the county of Multnomah and State of Oregon, have invented a certain new and useful Improvement in Adjustable Measuring-Covers for Jars, Cans, &c., of which the following is a specification, reference being had to the accompanying drawings as constituting a part thereof.

This invention has for its object to provide an adjustable measuring-cup, removably secured on and constituting a part of the cover of a jar, can, or other container; in other words, my measuring-cup constitutes the removal closure for the top of the jar.

My invention has various uses, but in order to explain the immediate purpose thereof I shall describe the same as constituting part of a jar containing ground coffee.

Since it is required, in order to obtain a good cup of coffee, to measure the quantity of ground coffee-beans used per cup, it was heretofore necessary to use a spoon, or other measuring device, for carrying the desired quantity of ground coffee from the container to the coffee-pot. In my device the cover of the container of the ground coffee is provided with a removable measure which may be adjusted to the number of cups of coffee desired, and by which the measuring process is quickly and accurately performed; all that is required being to invert the container so as to allow the ground coffee to fill the measuring cup-part of the cover, then closing a disk provided in the bottom of the measuring-cup, whereupon the coffee-jar may again be turned right-side up and the measuring-cup carried to the coffee-pot and there emptied of its contents, and finally returned in place on the cover of the coffee-jar.

My invention further has for its object to arrange my device, as a whole, in such wise that the same may be inexpensively made and sold. To this end my invention comprises the combination of parts illustrated in the drawings above referred to, in which, Figure 1 shows the upper part of a glass jar made with a screwed top or cover on which my measuring device is removably mounted; Fig. 2 represents the same view as Fig. 1, except that in this instance the jar and the measuring-cup have been inverted so as to fill the latter and the jar is held in such position as to show the turn-button of the closure disk in the bottom of the measuring-cup; Figs. 3 and 4 show substantially the same as Fig. 1, except that the top part of the cover of the jar is shown partly in section and my measuring-cup also in section is removed from the cover of the jar, and the rotatable closure disk in the bottom of my measuring-cup is positioned to close the same and thus confine the contents of the measuring-cup, so that the same may be carried to and emptied into the coffee-pot; and Fig. 5 shows the measuring-cup removed from the cover of the jar, and illustrates that my measuring-cup may be used independently thereof for measuring any material, as found convenient.

The jar, $a$, is of the so-called "Mason" jar type, being provided at its mouth with a screw-rim adapted to receive a cap or cover $b$. The top of the cover is made with an opening $b'$ (see Fig. 4) and in order to mount my measuring-cup on the cover $b$, the latter is made with an up-turned flange $c$, encompassing said opening $b'$. My measuring-cup consists of two telescoping parts $d, e$, the former being slidably contained in the latter. The part $e$ in fact constitutes the main body of my measuring-cup and is made with a permanent closure $f$, constituting the top closure of the jar $a$ when standing upright, as shown in Fig. 1, and constituting the bottom of my measuring-cup when the jar, $a$, is inverted, as shown in Fig. 2. The part $e$ is made with a vertical groove $g$, to receive and allow sliding movement to a stud or protrusion $h$, formed outwardly at the inner end of the piece $d$. The groove $g$ is made with a series of lateral spurs $i$, so that when the piece $e$ is given a short turn the stud $h$, having become positioned opposite to one of the spurs $i$, will enter the same and thus lock the pieces $d$ and $e$ in the position to which adjusted. The outer face of the piece $d$ is provided with a series of numerals $j$, which represents a specific measurement of ground coffee for making a certain number of cups of coffee, as for example, 4, 5, 6, etc.; the parts, as shown, being so relatively arranged that when my measuring-cup is adjusted to its smallest capacity the numeral 4, of the series of numerals $j$, will be disclosed under the bottom rim of the piece $e$, while the other numerals 5, 6, etc., will be concealed from view. Relatively moving the pieces $d, e$, so as to position the parts to disclose to view the numeral 5 will increase the capacity of my cup so as to make the same contain sufficient ground coffee for making five cups, etc.

Immediately below the rim of the piece e, said parts or pieces d, e, being adjusted to give my measuring-cup its smallest capacity, I journal a disk k, soldered or otherwise fastened to a shaft l, provided with an exterior turn-button m. I prefer also to provide a stop n (see Figs. 2 and 3) so as to limit the rotation of the disk k, and thus provide for readily bringing the same in its proper horizontal position, and thereby in each case obtaining an even measurement.

My device operates as follows: Having in the first instance adjusted the pieces d, e, so as to give my measuring-cup the desired capacity, I invert the jar, a, so as to cause the ground coffee therein contained to fill the measuring-cup. The disk k is previously adjusted, by manipulating the turn-button, to place the same in vertical position, and thus allow the measuring-cup to be filled. I then, by again manipulating the turn-button m, forcibly turn the disk k against the stop n. The jar having been turned back to its upright position, the measuring-cup may now be removed from the rim c of the cover b of the jar, and thence carried to the coffee-pot, discharging its contents by opening the disk k. And finally the measuring-cup will be replaced on the cover b. The simple construction of my device is self-suggestive to every practical mechanic.

While I have described my device as a measure for coffee only, it is self evident that the same has many other uses. The measuring numerals j have merely been adapted to represent a convenient form of notation, for indicating the measurements of cups of coffee. My device, however, is also usable for measuring any dry material, and the measuring numerals may be re-arranged as required to suit such other use.

I claim:

1. The combination with the cover of a container having a top-opening, of a rim-flange formed on the upper surface of the top of the cover encompassing the opening thereof, a measuring-cup removably mounted on said rim-flange and constituting a closure for said opening of the cover, said measuring-cup comprising telescoping adjustable members, a permanent closure for the outer end of one of said members, a shaft journaled transversely in the mouth of the other of said members, said shaft having an outwardly projecting end, a disk fast on said shaft, and a turn-button on said projecting portion of the shaft.

2. The combination with a cover of a container having a top-opening, of a rim-flange formed on the upper surface of the top of the cover encompassing the opening thereof, a measuring-cup removably mounted on said rim-flange and constituting a closure for said opening of the cover, said measuring-cup comprising telescoping adjustable members, a permanent closure for the outer end of one of said members, a shaft journaled transversely in the mouth of the other of said members, said shaft having an outwardly projecting end, a disk fast on said shaft, a turn-button on said projecting portion of the shaft, one of said members having graduating marks, and means for locking said telescoping members as adjusted relatively to said graduating marks.

JOS. SEIFFERT.

Witnesses:
H. K. SARGENT,
T. J. GEISLER.